United States Patent [19]

Mackal

[11] 4,176,681
[45] Dec. 4, 1979

[54] ORAL INFLATION VALVE

[76] Inventor: Glenn H. Mackal, Buena Vista Dr., Ringwood, N.J. 07456

[21] Appl. No.: 831,281

[22] Filed: Sep. 7, 1977

[51] Int. Cl.$^2$ ............................................. F16K 15/00
[52] U.S. Cl. .............................. 137/516.29; 137/223; 137/541
[58] Field of Search .................. 137/223, 541, 516.29; 251/323, 332

[56] References Cited

U.S. PATENT DOCUMENTS

| 3,356,104 | 12/1967 | Gaualizo | 137/516.29 |
| 3,590,851 | 7/1971 | Bogossian | 137/541 X |
| 3,825,222 | 7/1974 | Petrova | 137/516.29 X |
| 3,861,646 | 1/1975 | Douglas | 251/332 X |

FOREIGN PATENT DOCUMENTS 144437  4/1950  Australia ............................ 137/516.29

Primary Examiner—Harold W. Weakley

[57] ABSTRACT

Improved check valve adapted for operation under light pressure, as in the oral inflation of inflatable articles. The valve has a valve body and a movable valve element therein, the valve element having a body which carries an annular sealing means cooperating with and selectively sealing an axially outwardly converging valve seat on the valve body, the angle of engagement between the sealing member of the valve element and the valve seat at the valve-closed position of the valve element exceeding the angle of repose of the engaging parts of the sealing member and the valve seat. The sealing member, which is molded in place on the body of the valve element, has an annular main part surrounding an enlarged head on the body of the valve element and a sheet-like disc which is integral with the main part of the sealing member and overlies the axially inner end of the head on the body of the valve element. The sealing member has a flange which first extends generally radially outwardly from an annular root at the axially outer end of the main part of the sealing member and then turns axially inwardly to form an annular flange which, in relaxed condition, lies generally coaxial of and radially spaced from the annular body of the main part of the sealing member. Normal sealing between the sealing member and the valve seat takes place in the vicinity of the root of the flange. When engaging the valve seat, the flange yields to varying degrees, depending upon the pressure to which it is subjected.

2 Claims, 4 Drawing Figures

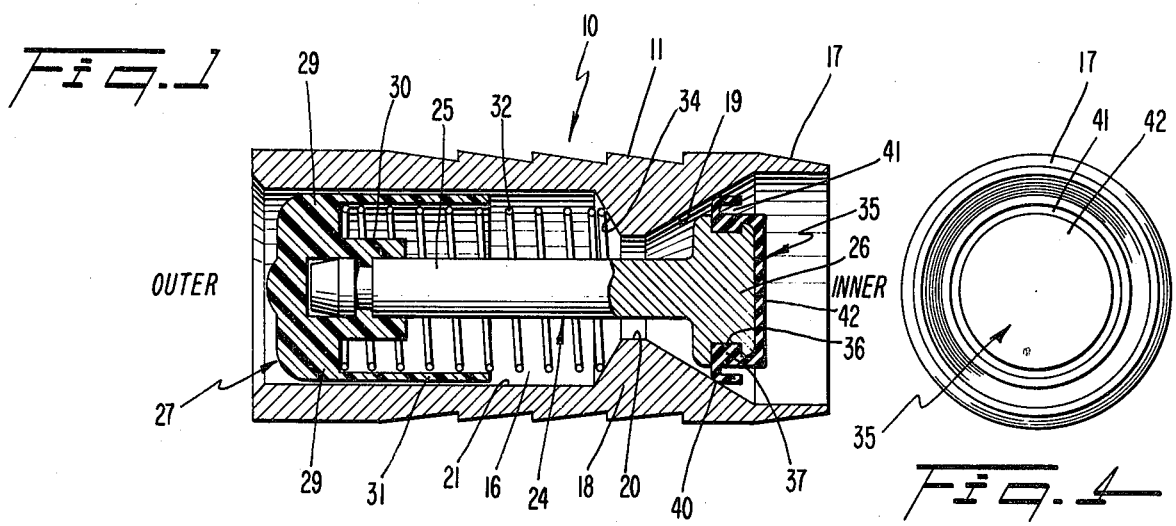
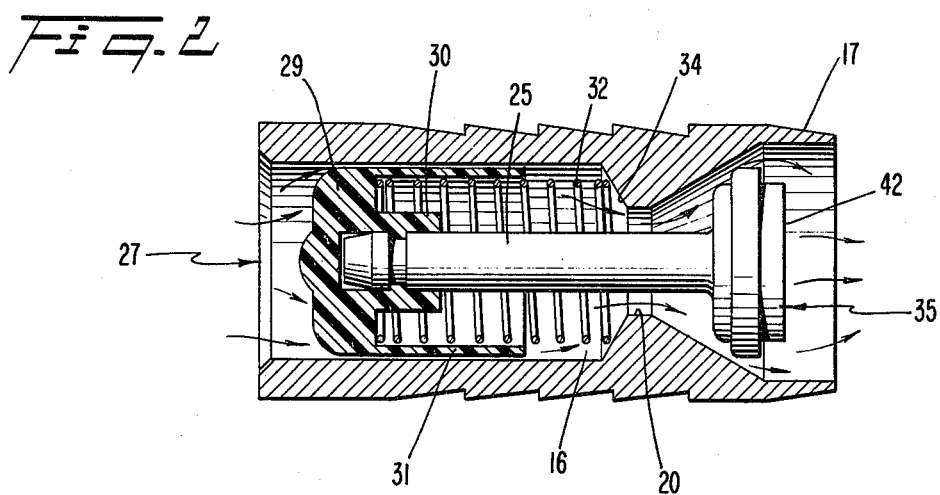
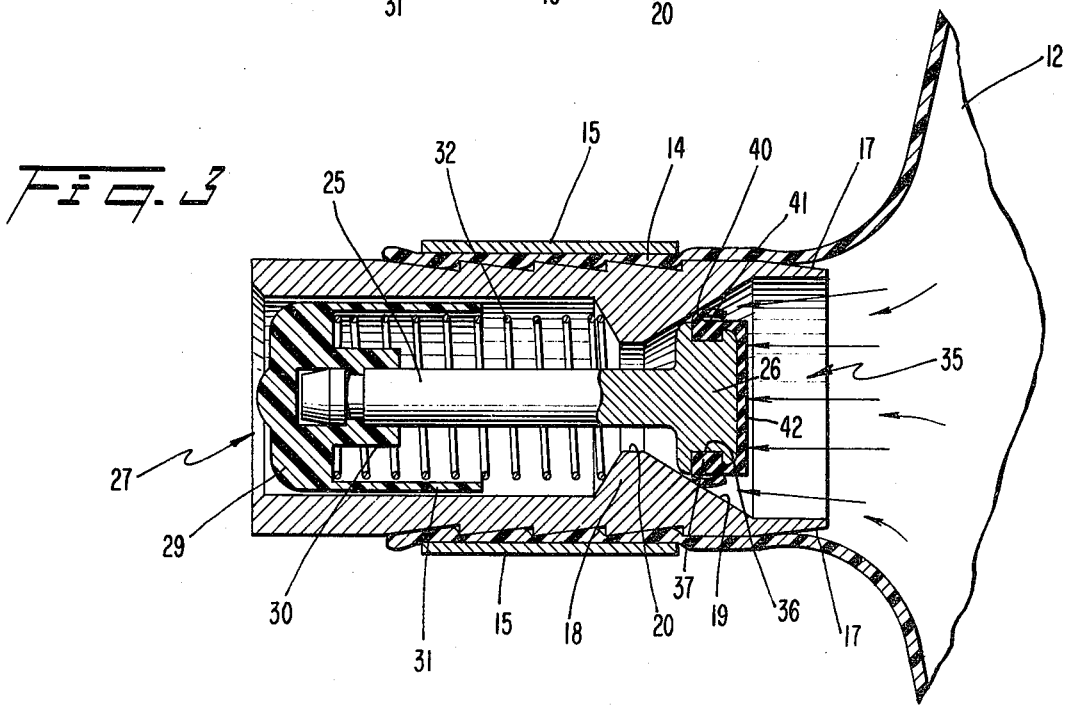

ORAL INFLATION VALVE

This invention relates to an improved check valve adapted for operation under light pressure, as in the oral inflation of inflatable articles.

The valve of the present invention incorporates a number of improvements over the oral inflation valve disclosed in U.S. Pat. No. 3,351,081. Such prior valve had a valve body with a longitudinal passage therethrough, there being a movable valve element in said passage in the body, the valve element carrying an annular sealing member cooperating with and selectively sealing an annular valve seat in the valve body which surrounded the passage therethrough. The valve element was urged toward valve-closed position by a light coil-compression spring which was overcome by oral air pressure. In the prior valve the sealing means on the valve element was an O-ring which was mounted in an annular groove on an enlarged head on the valve element. The O-ring cooperated with a part-toroidal valve seat which surrounded the passage through the valve body.

Although the prior valve generally worked well, at times difficulties were experienced with it. Leakage sometimes occurred between the O-ring and the annular groove on the head of the valve element. In spite of the close tolerances of manufacture of the parts of the valve, misalignment sometimes occurred between the valve body and the valve element so that the O-ring did not completely engage and seal the valve seat in the valve body.

In the valve of the present invention, the sealing member on the enlarged head of the valve element, rather than being an after-applied O-ring mounted in an annular groove on such head, is a molded-in-place annular member having a main annular body in an annular groove on the head of the valve element, and a sheet-like disc which is integral with the main part of the sealing member and overlies the axially inner end of the head on the valve element. Such construction eliminates any possibility of leakage of fluid between the sealing member and the head of the valve element.

In the preferred embodiment of the valve shown herein, the sealing member has a flange which first extends generally radially outwardly from an annular root at the axially outer end of the main part of the sealing member and then turns axially inwardly to form an annular portion of the flange which, in relaxed condition, lies generally coaxial of and radially spaced from the annular body of the main part of the sealing member. Normal sealing between the sealing member and the valve seat takes place in the vicinity of the root of the flange. Such construction of the sealing member on the valve member gives the sealing member a desirable yieldability which aids it in conforming to the valve seat on the valve body under varying pressures, thereby ensuring sealing between the valve body and the valve element when the latter is in its valve-closed position. Under increasing pressures within the inflatable article, the annular flange of the sealing member on the valve element is progressively forced radially inwardly toward the main body of the sealing member until under fairly high pressures the flange is forced into engagement with the main body of the sealing member and prevents any further substantial axially outward movement of the valve element relative to the valve body.

The valve of the invention will be more readily understood upon reference to the accompanying drawings, in which:

FIG. 1 is a view in vertical axial section through an illustrative embodiment of the valve of the invention, certain of the parts being shown in elevation, the valve element being shown in its valve-closed position;

FIG. 2 is a view similar to FIG. 1 but with the valve element being shown in a valve-open position;

FIG. 3 is a fragmentary view showing the valve in combination with a fragmentarily-illustrated inflatable article, the valve being shown in a manner somewhat similar to that of FIG. 1 but with the valve element thrust into a valve-closed position in which it lies somewhat further axially outwardly than in FIG. 1 as a result of its subjection to the pressure of fluid within the inflatable article; and FIG. 4 is a view in end elevation of the valve, the view being taken in the direction from right to left in FIG. 1.

Turning now to the drawings, the illustrative embodiment of the valve of the invention is generally designated by the reference character 10. Valve 10 has a generally circular cylindrical elongated body 11 which in FIG. 3 is shown as being inserted within a tube 14 extending from an inflatable article 12. The tube 14 is forcibly constricted and held against the annularly serrated outer surface of the axially inner end of the valve body by a metal band 15, as shown. Valve body 11 has a passage 16 extending therethrough, the passage being of greatest diameter at the axially inner hood 17 of the valve body. The diameter of the passage progressively decreases axially outward of the valve body in the region of a frusto-conical valve seat 19, the passage reaching its minimum diameter at a shoulder 18 having a central passage 20 therethrough. Axially outwardly of the shoulder 18 the passage 21 is of circular cylindrical shape having a diameter intermediate between that at the hood 17 and zone 20 of the shoulder.

An axially reciprocable valve element 24 is disposed within the valve body 11 coaxial thereof, the valve element having an axially outer circular cylindrical stem 25 and an axially inner enlarged head 26 coaxial of the stem 25. A member 27 which may be made of plastic material, as shown, has a snap-on connection 30 with the axially outer end of the stem 25 of the valve element. Member 27, which has a plurality of wings 29 thereon equally angularly spaced thereabout, guides the axially outer end of the stem 25 of the valve element axially of the valve body while permitting the passage of fluid such as air through the spaces between the wings thereof. The outer end of the member 27 lies close enough to the outer end of the valve body to permit member 27 to be engaged by a finger, a match, or otherwise to allow the valve element to be manually thrust into the valve-open position of FIG. 2.

Member 27 has a thin-walled circular cylindrical skirt 31 integral therewith, the outer surface of the skirt guidinly engaging the inner surface of the valve body 11 at the portion 21 of the passage therethrough, and also serving to house the axially outer and middle portions of a coil compression spring 32. The axially outer end of such spring bears against the axially inner edges of the wings 29 on the member 27, the axially inner end of the spring bearing against a frust-conical surface 34 of the shoulder 18.

The head 26 of the valve element 24 carries a sealing member 35 having a main annular portion 37 of generally rectangular cross-section which is integrally molded in an annular groove 36 in the head 26. The sealing member 35 has a flange with a radially outwardly extending annular portion 39 integrally attached to the axially outer end of the main body 37 of the sealing member, the flange then turning at a zone 40 to form an axially inwardly extending annular part or band 41 which, in relaxed condition, lies generally coaxial of and radially spaced from the main body 37 of the sealing member by an annular groove 41. Normal sealing between the sealing member and the valve seat in the valve body takes place in the vicinity of the reverse bend 40 of the flange.

When the valve element 24 is subjected to higher pressures, as when the pressure of a fluid within the inflatable device 12 is added to the force exerted upon the valve member by the spring 32, the portion of the sealing member generally at the junction between the radially extending and axially extending portions of the flange thereon are distorted as shown in FIG. 3. This increases the area of engagement between the valve seat 19 in the valve body and the sealing member 35 on the valve element. When the forces acting upon the valve element to thrust it to the left (FIG. 3) reach a certain value, the axially inner end of the flange 39 engages the outer surface of the main part of the sealing member 35, thereby substantially to stop further travel of the valve element to the left.

Integral with the main part of the sealing means 35 there is a generally disc-shaped member 42 which overlies the axially inner face of the head 26 of the valve element, portion 42 being attached to the main part of the sealing member by an axially outwardly extending annular flange portion, as shown. The described construction and manner of mounting of the sealing member on the head of the valve element effectively eliminates any possible path of leakage of fluid between the sealing member and the head 26 of the valve element.

In an illustrative preferred but non-limiting embodiment, the body 11 of the valve is made of anodized black aluminum 2011-T3, the valve element 24 is made of nickel-plated brass, and the sealing member 35 is made of Buna N synthetic rubber having a 40±5 durometer rating within a temperature range of −65° to 212° F.

The apex angle of the frusto-conical seat 19 in the valve body 11 is so chosen that the angle of engagement between the sealing member 35 and the valve seat 19 at the valve-closed position of the valve element 24 exceeds the angle of repose of the engaging parts of the sealing member and the valve seat.

Although the invention has been illustrated and described with reference to a single preferred embodiment thereof, it is to be expressly understood that it is in no way limited to the disclosure of such a single embodiment, but is capable of numerous modifications within the scope of the appended claims.

What is claimed is:

1. A check valve, comprising
   a valve body having a passage therethrough,
   a radially inwardly and axially outwardly converging annular valve seat surrounding the passage,
   a movable valve element having a body,
   a sealing member having an annular main body mounted on the body of the valve element, the sealing means selectively cooperating with the valve seat to seal the passage when the valve element is in its valve-closed position,
   the sealing member being made of elastomeric material and molded in place on the body of the valve element, under increasing thrusting of the sealing member against the valve seat the first portion of the flange on the sealing member being increasingly deformed to narrow the space between the second portion of the flange and the main part of the sealing member, and
   upon the imposition of a predetermined thrust of the sealing member against the valve seat the radially inner surface of the second portion of the flange engages the radially outer surface of the main part of the sealing means.

2. A check valve according to claim 1, comprising a sheet-like disc integral with the body of the sealing member and overlying the axially inner end of the body of the valve element.

* * * * *